United States Patent [19]

Bennett

[11] Patent Number: 4,671,714

[45] Date of Patent: Jun. 9, 1987

[54] SYSTEM FOR TRANSPORTING A SEMI-TRAILERS ON TWO INTERCONNECTED VEHICLES

[76] Inventor: Robert W. Bennett, 3150 Wilshire, Springfield, Mo. 65804

[21] Appl. No.: 766,652

[22] Filed: Aug. 16, 1985

[51] Int. Cl.[4] .......................... B61D 3/18; B61D 47/00
[52] U.S. Cl. ....................................... 410/57; 403/324;
403/348; 410/1; 410/9; 410/30; 410/58;
410/65; 105/3
[58] Field of Search ......................................... 410/1-4,
410/7, 30, 44, 45, 53, 54, 56, 57, 58, 64, 65, 8, 9;
105/3, 4 R, 4.1; 403/348, 379, 324

[56] References Cited

U.S. PATENT DOCUMENTS

| | | | |
|---|---|---|---|
| 2,788,751 | 4/1957 | Russell | 105/436 |
| 2,916,238 | 12/1959 | Fahland . | |
| 2,992,621 | 7/1961 | Schoen | 410/1 |
| 3,033,129 | 5/1962 | De Grandpre . | |
| 3,102,646 | 9/1963 | Clejan | 410/64 |
| 3,147,715 | 9/1964 | Myers . | |
| 3,348,502 | 10/1967 | Burns et al. | 410/1 |
| 3,358,954 | 12/1967 | Smith et al. . | |
| 3,490,389 | 1/1970 | Brown | 410/1 X |
| 3,536,282 | 10/1970 | Ferris . | |
| 3,610,168 | 10/1971 | Macomber | 410/64 |
| 3,689,106 | 9/1972 | Young | 410/1 |
| 3,721,199 | 3/1973 | Hassenauer . | |
| 3,789,774 | 2/1974 | Wilk . | |
| 3,837,295 | 9/1974 | Fedele . | |
| 4,129,079 | 12/1978 | Shannon | 410/1 |
| 4,179,997 | 12/1979 | Kirwan . | |
| 4,191,107 | 3/1980 | Ferris et al. | 105/4 R |
| 4,339,996 | 7/1982 | Brodeur et al. . | |

FOREIGN PATENT DOCUMENTS 449996 9/1927 Fed. Rep. of Germany ...... 403/348

OTHER PUBLICATIONS

Railway Age, "An All-Purpose Flat Car", May 31, 1954.

Primary Examiner—Robert B. Reeves
Assistant Examiner—Scott H. Werny
Attorney, Agent, or Firm—Litman, Day & McMahon

[57] ABSTRACT

A system for transporting a semi-trailer with a king pin and a wheel assembly on first and second drawn vehicles includes a stanchion on the first vehicle for releasably securing the trailer king pin. Ramp assemblies are provided on the vehicles and are extendable therebetween for loading and unloading the trailer. A pair of wheel cradles are independently and pivotally mounted to a butt plate box which in turn is adjustably mounted on a platform of the second vehicle. The wheel cradles receive the wheel assembly and have combination chocks and ramps pivotally mounted thereon.

13 Claims, 17 Drawing Figures

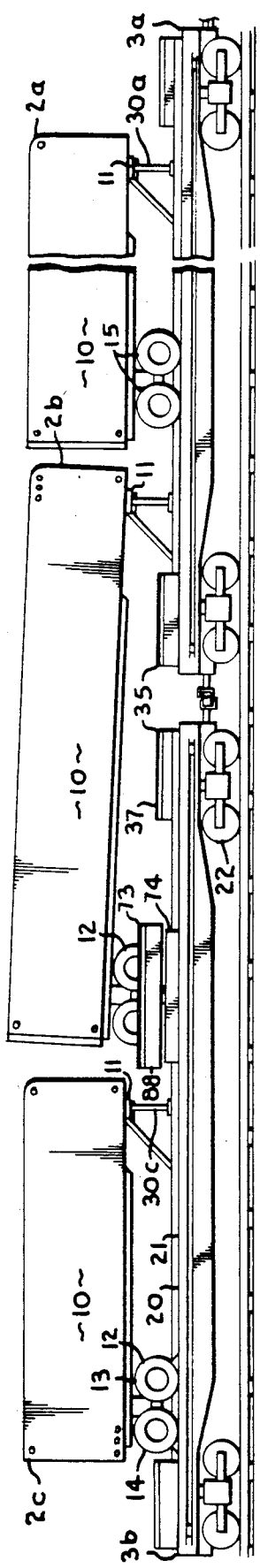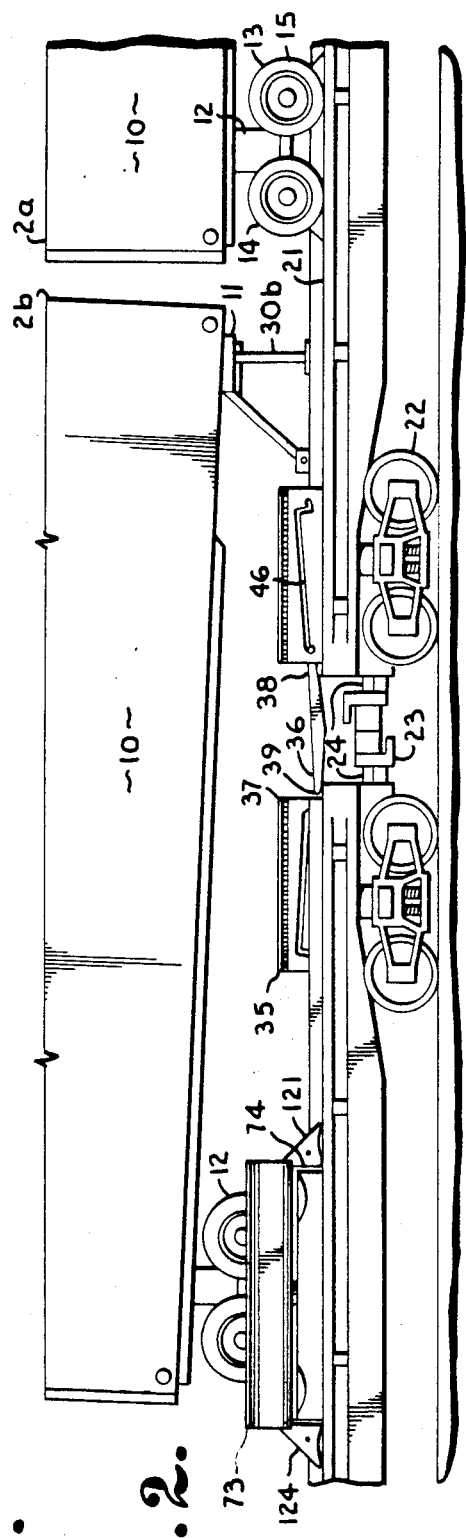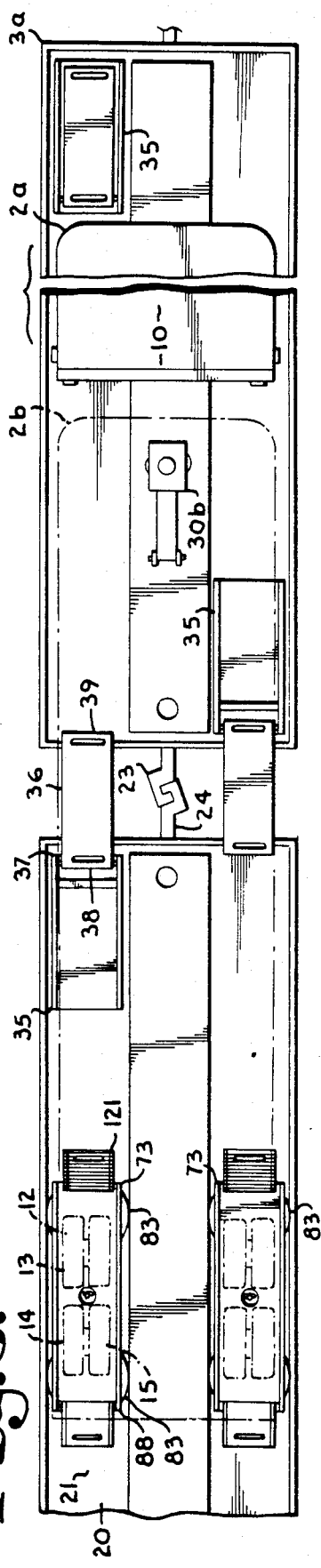

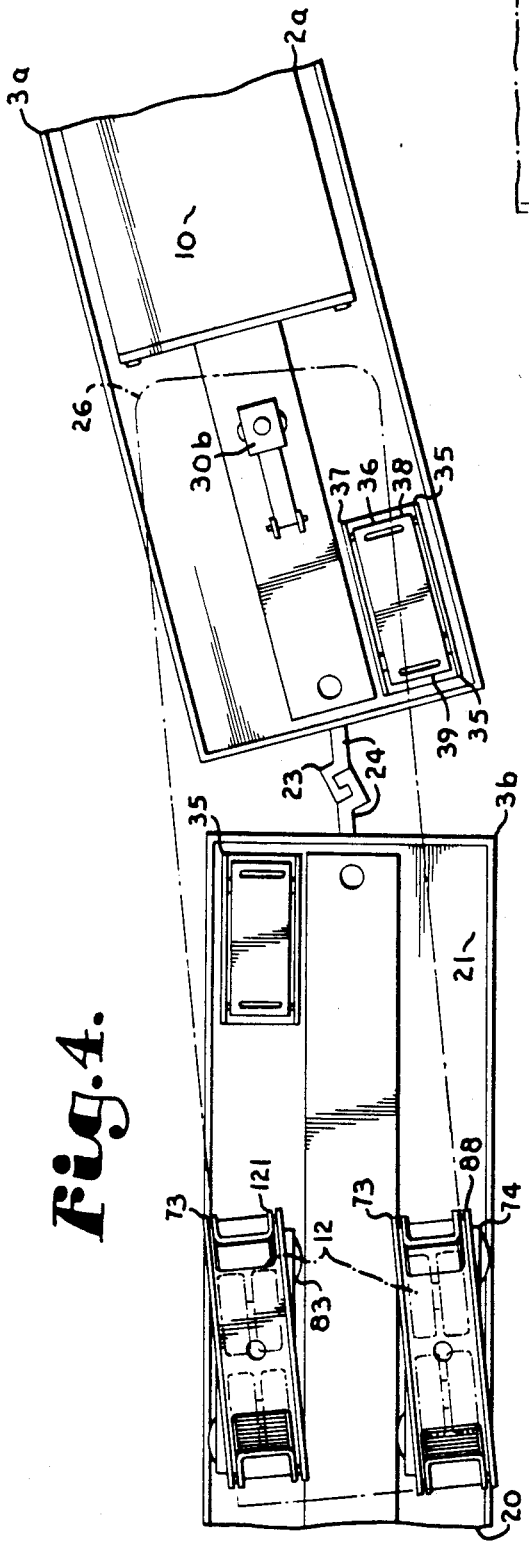
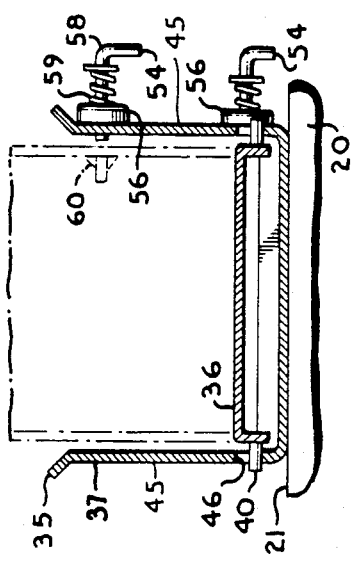
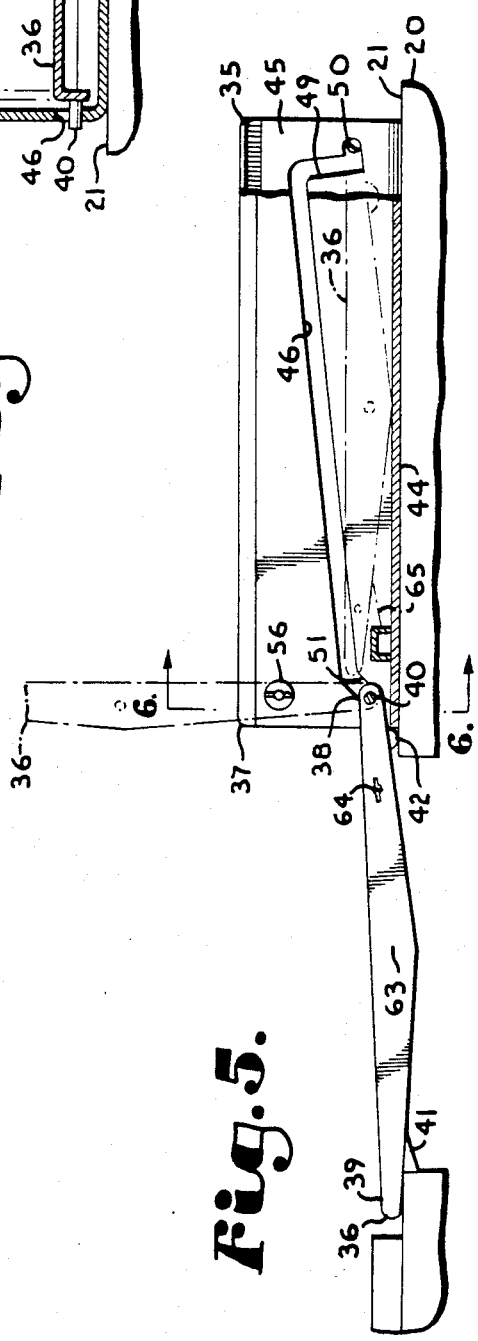
Fig. 4.
Fig. 6.
Fig. 5.

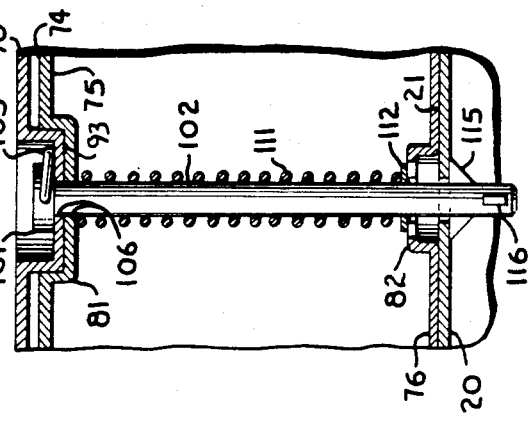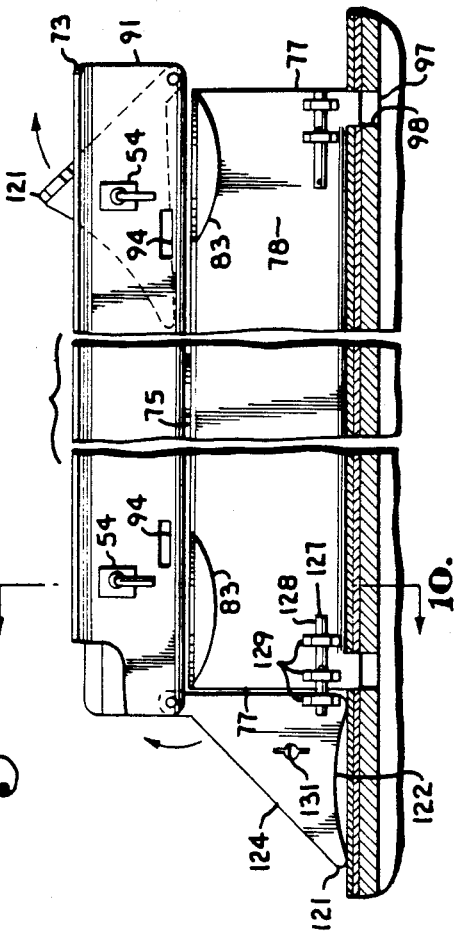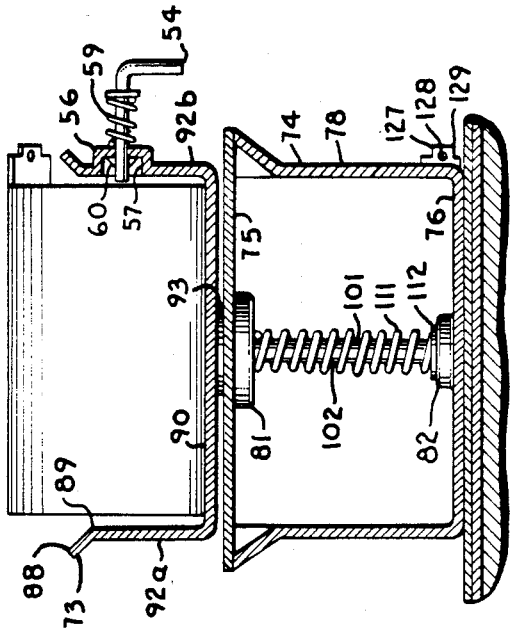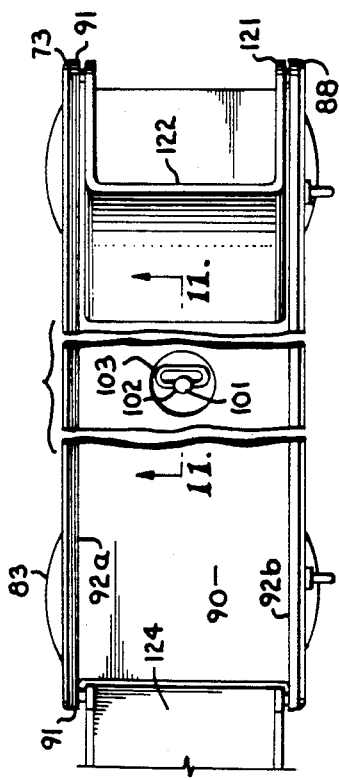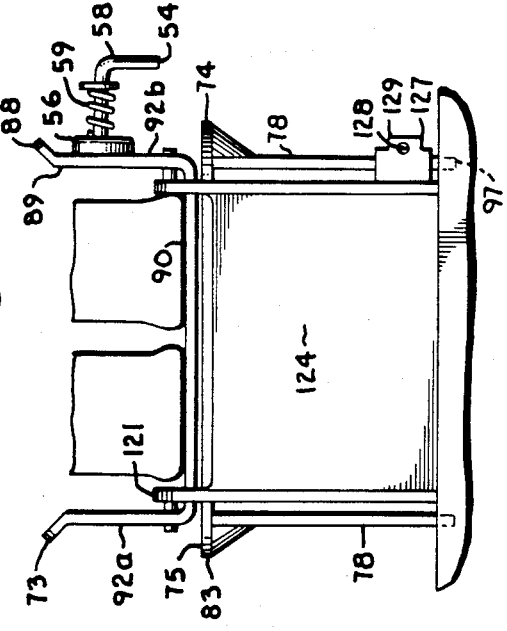

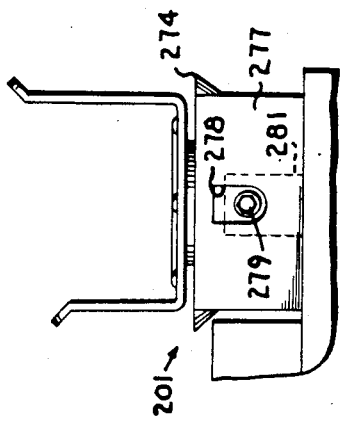
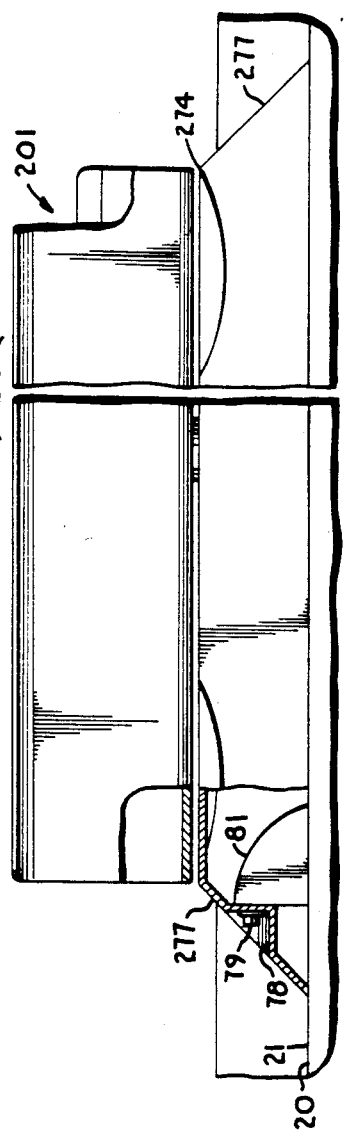
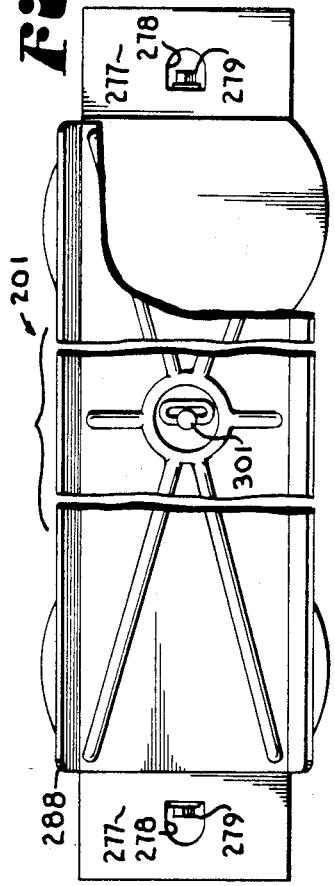
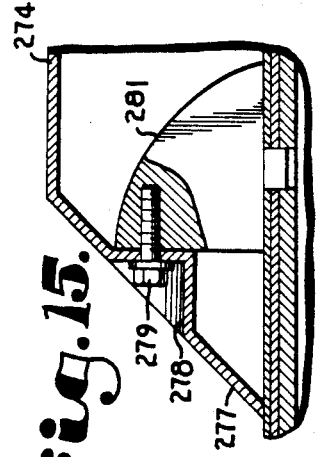
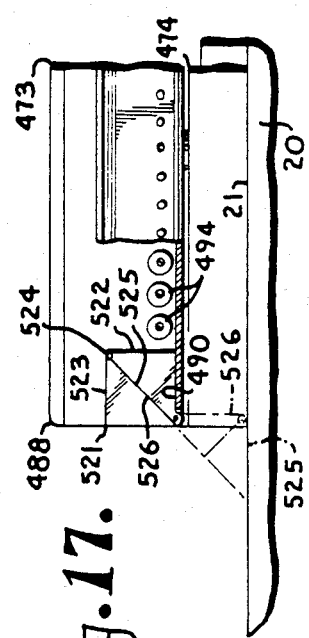
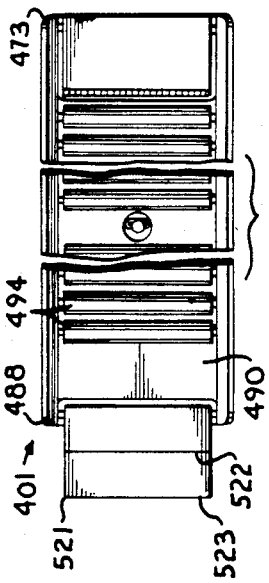

SYSTEM FOR TRANSPORTING A SEMI-TRAILERS ON TWO INTERCONNECTED VEHICLES

BACKGROUND OF THE INVENTION

1. Field of the Invention

The present invention relates generally to railway rolling stock, and in particular to a system for piggybacking three semi-trailers on two modified flat cars.

2. Description of the Prior Art

In the transportation industry, it is often more economical to transport semi-trailers "piggyback" on railway flat cars than it is to pull them with tractor units over the road. The cost advantage enjoyed by railway transportation in this regard is normally proportional to the distance involved because the terminal costs associated with loading and unloading the trailers on flat cars are less significant in comparison to the total transportation costs on long routes. Accordingly, there have been developed various prior art devices for securing semi-trailers on railway flat cars. For example, the Fahland U.S. Pat. No. 2,916,238 and the Smith U.S. Pat. No. 3,358,954 both show foldable fifth wheel stanchions for mounting on railway flat cars and for releasable attachment to the king pin of a semi-trailer.

However, it has been recognized that there are inefficiencies inherent in the basic concept of transporting semi-trailers on railway flat cars. For example, the existing flat car rolling stock used by many railroads for piggyback transportation tends to be relatively heavy and designed for far greater load capacities than are normally incurred in transporting semi-trailers. Thus, a railroad incurs a substantial weight penalty in piggyback operations which in turn leads to higher fuel costs per unit of travel distance. The Grandpre U.S. Pat. No. 3,033,129 and the Kirwan U.S. Pat. No. 4,179,997 each addresses this problem and provides for a transport system wherein much of the bulk associated with normal railway flat cars is eliminated. However, the systems proposed in the Grandpre and the Kirwan patents require rolling stock designed specifically for piggyback operation, and cannot be accomplished through practical modification of existing railway rolling stock.

Another problem with piggyback service relates to matching the lengths of the trailers to the flat cars. It is this problem to which the present invention is addressed. Although flat cars are available in lengths ranging from 40 feet to 90 feet and more, a fairly significant number are in the 80 to 90 feet range. Semi-trailers are also available in a variety of lengths, but a significant number are in the 40 to 50 feet range. Thus, it is fairly common that semi-trailers must be transported one-on-one because they are too long for double, tandem loading on available flat rolling stock. The Brodeur et al. U.S. Pat. No. 4,339,996 addresses this problem and calls for an articulated rail car unit having first and second car bodies each with its own truck units and adapted to receive a single semi-trailer. However, the cars proposed therein are specifically designed for the disclosed purpose and would not be readily convertible from existing railway stock. Thus, except when flat cars are matched with trailers either approximately equal to or approximately half their lengths, piggyback transportation of semi-trailers tends to be somewhat inefficient because relatively large amounts of space are wasted and unoccupied in one-on-one loadings.

SUMMARY OF THE INVENTION

In the practice of the present invention, a system for transporting three semi-trailers with king pins and wheel assemblies on front and back railroad flat cars with platforms is provided. A front trailer is secured to the front of the front flat car and a back semi-trailer is secured to the back of the back flat car. A middle semi-trailer stradles straddles the flat cars, its king pin being attached to a foldable stanchion on the front flat car and its wheel assembly being received in a wheel support assembly mounted on the back flat car. The wheel support assembly includes a support with a cradle pivotally mounted thereon. The cradle receives the wheel assemblies and pivots when the train rounds a curve. Chocks are provided in the cradles during transit and convert to ramps for driving the wheel assemblies onto and off of the cradles.

OBJECTS OF THE INVENTION

The principal objects of the present invention are: to provide a system for transporting trailers on railway flat cars; to provide such a system for piggybacking three semi-trailers on two flat cars; to provide such a system wherein existing railway flat cars can be readily modified to accommodate the semi-trailers; to provide such a system which can be implemented with relatively simple modifications to existing railway flat cars; to provide such a system which is particularly adapted for use with semi-trailers which are commonly available and currently in use by railroad companies; to provide such a system which is adapted for use with flat cars having lengths in the 80 to 90 feet range; to provide such a system which is adapted for use with trailers having lengths in the 40 to 50 feet range; to provide such a system which is adapted for efficiently transporting cargo by piggyback rail service; to provide such a system which reduces fuel costs for transporting freight piggyback; to provide such a system adapted to increase the revenue of railroad companies which employ it; to provide such a system which can be implemented at a lower unit cost per flat car than new flat cars can be purchased for; to provide such a system which provides fuel savings over existing piggyback operations; to provide such a system which allows trains which employ it to operate at faster speeds; to provide such a system whereby equivalent numbers of trailers can be piggybacked on shorter trains in comparison with existing railroad equipment; to provide such a system which will minimize the labor costs and equipment usage costs for the railroad companies which employ it; and to provide such a system which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a side elevation of a system for transporting semi-trailers on railway flat cars embodying the present invention.

FIG. 2 is an enlarged side elevation of the system with a trailer loading ramp extended between the flat cars.

FIG. 3 is a top plan of the system.

FIG. 4 is a fragmentary top plan of the system showing the orientations of a semi-trailer and the flat cars as they would appear in a curve.

FIG. 5 is an enlarged side elevation of a ramp assembly with the ramp in its extended position.

FIG. 6 is a cross-section of the ramp assembly taken generally along line 6—6 in FIG. 5.

FIG. 7 is a top plan of the system particularly showing a wheel support assembly.

FIG. 8 is an enlarged side elevation of the wheel support assembly.

FIG. 9 is an end elevation of the wheel support assembly.

FIG. 10 is a section of the wheel support assembly taken generally along line 10—10 in FIG. 8.

FIG. 11 is a fragmentary cross-section of the wheel support assembly taken generally along line 11—11 in FIG. 7.

FIG. 12 is a side elevation of a wheel support assembly for a first modified embodiment of the present invention.

FIG. 13 is an end elevation of the wheel support assembly shown in FIG. 12.

FIG. 14 is a top plan of the wheel support assembly shown in FIG. 12.

FIG. 15 is an enlarged, fragmentary side elevation of the wheel support assembly shown in FIG. 12 with portions broken away to reveal the internal construction thereof.

FIG. 16 is a top plan of a wheel support assembly for a second modified embodiment of the present invention.

FIG. 17 is a fragmentary side elevation of the second modified embodiment of the present invention.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates a system for transporting a trailer and the like on two vehicles embodying the present invention. As shown in FIG. 1, the system is particularly designed for transporting three semi-trailers 2 on two flat cars 3. For purposes of orientation only and without limitation, the direction of travel is to the right in FIG. 1. Thus, front, middle and rear semi-trailers 2a, 2b and 2c are shown on front and rear flat cars 3a and 3b.

Each semi-trailer 2 inlcudes a cargo-carrying enclosed body 10 and a hitch or king pin 11 adjacent to the trailer front end. At the trailer back end, a wheel structure or bogie 12 is provided and includes front and back wheel pairs 13 and 14 respectively in tandem relationship on each side of the semi-trailer 2. Each wheel includes a pneumatic tire 15.

Each flat car 3 includes a platform 20 with an upper deck surface 21. The platform 20 extends between a pair of conventional railroad truck units 22. Extending from each end of each flat car 3 is a conventional coupler 23 on the end of an articulated drawbar 24.

A plurality of fifth wheel stanchions 30 are provided for receiving the trailer king pins 11 and supporting the front ends of respective semi-trailers 2. As shown in FIG. 1, front and middle stanchions 30a and 30b are located on the front flat car 3a and a rear stanchion 30c is located approximately midway on the rear flat car 3b. The stanchions 30 are of the type commonly employed on flat cars used for piggyback operations except that they are detachably mounted on the platforms 20 and may be placed at desired positions along the lengths thereof to accommodate trailers 2 of various lengths.

A pair of ramp assemblies 35 are mounted on opposite corners (e.g. left front and right rear as shown in FIG. 3) of the flat car platforms 20 on the upper decks 21 thereof. Each ramp assembly 35 includes a ramp 36 mounted within a ramp carrier 37. The ramps 36 are currently employed on flat cars in use by the railroad companies for piggyback operations and allow semi-trailers and trucks to be driven between the flat cars. In one-on-one and two-on-one piggyback operations previously practiced by railroad companies, the ramps were foldable between horizontal positions bridging adjacent ends of the flat cars and vertical travel positions. However, the middle semi-trailer 2b prevents the placement of a ramp 36 in a vertical position thereunder, so ramp carriers 37 are provided which can store the ramps 36 flat when not in use. The ramp carriers 37 also permit the ramps 36 to be tilted to vertical storage positions, as would be possible with the ramps 36 located at the front end of the front flat car 3a and the back end of the back flat car 3b.

Each ramp 36 includes proximate and distal ends 38 and 39. A pair of guide pins 40 extend laterally outwardly from the proximate end 38. A transversely-extending lock bar 41 protrudes downwardly from the underside of each ramp 36 near its distal end 39. A transversely-extending support bar 42 protrudes downwardly from the underside of each ramp 36 near its proximate end 38.

As shown in FIG. 6, each ramp carrier 37 has a substantially U-shaped cross-sectional configuration with a bottom 44 secured to the platform upper deck surface 21 and a pair of sides 45. The ramp carrier sides 45 are spaced to receive the semi-trailer paired wheels 13 and 14 therebetween. A ramp guide slot 46 is formed in each ramp carrier side 45 and slidably receives a respective guide pin 40. Each slot 46 slopes downwardly towards a respective end of the flat car 3 for most of its length and terminates at a downwardly and inwardly extending proximate leg 49 with a notch 50 in proximity to an inner end of the ramp carrier 37. The proximate leg 49 forms substantially a right angle with the adjacent part of the slot 46. Adjacent to the outer end of the ramp carrier 37 each slot 46 includes a distal leg 51 extending downwardly and outwardly towards the adjacent end of the flat car 3.

A pair of ramp locking assemblies 54 are provided, one being located approximately halfway along the outer ramp carrier side 45 and the other being located in proximity to the end of the ramp carrier side 45 adjacent to the end of the flat car 3. Each locking assembly 54 includes a handle boss 56 forming an inwardly-open receiver 57 (FIG. 10). An L-shaped handle 58 extends through the boss 56 and into the receiver 57. On the outside of the boss 56, the handle 58 receives a helical spring 59 for urging the handle 58 outwardly. A locking handle pin 60 extends transversely through the handle 58 and is located within the receiver 57 with the locking assembly 54 in its unlocked positions.

Middle and end ramp locking apertures 63 and 64 are located approximately midway along the side of the ramp 36 and near the ramp proximate end 38 respectively. The apertures 63 and 64 are adapted to receive the locking handle 58 and pin 60. When the pin 60 clears the aperture 63 or 64, the handle is rotated approximately 90° to lock the assembly 54. The spring 59 retains the handle 58 in either its locked or unlocked position until purposely shifted to the other. With the ramp 36 in its retracted position as shown in phantom in FIG. 5, the lock bar 41 engages a retainer bar 65 extending transversely across the ramp carrier bottom 44, the guide pins 40 are located in the notches 50 and the locking handle 58 is locked into the ramp 36. The ramp 36 is thereby secured within the ramp carrier 37 to prevent it from accidentally dislodging during transit.

The ramp carrier 37 is also designed to store the ramp 36 in a vertical orientation as also shown in phantom in FIG. 5. In this position, the guide pins 40 are positioned at the bottom ends of the guide slot distal legs 51. The ramp 36 is folded vertically and the handle 58 of the end ramp locking assembly 54 is inserted into the end aperture 64 and locked whereby the ramp 36 is securely retained in a vertical travel position.

A pair of wheel support assemblies 73 is provided for the wheel assembly 12 of the middle semi-trailer 2a on the rear flat car 3b. Each wheel support assembly 73 includes a butt plate box or spacer 74 approximately six to twelve inches high with a top 75, a bottom 76, opposite ends 77 and opposite sides 78. Upper and lower pivot pin receivers 81 and 82 extend into the box 74 from its top 75 and bottom 76. A pair of cradle support flanges 83 extend laterally outwardly from each box side 78, each in proximity to a respective box end 77. The cradle support flanges 83 are flush with the upper surface of the box top 75.

A respective trailer wheel cradle 88 is placed on each respective box top 75 and has a U-shaped transverse cross-sectional configuration as shown in FIG. 10. Each cradle 88 includes an open top 89, a bottom 90, open ends 91 and inner and outer sides 92a and 92b. The cradle sides 92a and 92b are spaced approximately as far apart as the ramp carrier sides 45 so that the wheel pairs 13 and 14 can easily be driven therebetween. The inner cradle side 92a is lower than the outer cradle side 92b so that the axle of the wheel structure 12 will clear the forearm. Each cradle side 92 has a pair of spaced, rectangular openings 94 adapted to receive the prongs of a fork lift and also adapted to permit precipitation to drain from the cradle 88.

An upwardly-open cradle pivot pin receiver 93 extends downwardly from the cradle bottom 90 and is rotatably positioned in the upper box pivot pin receiver 81. Each wheel support assembly 73 has four alignment tabs 97 extending downwardly from the four corners of the box bottom 76. The tabs 97 are positioned in slots 98 open at the platform upper deck surface 21 and arranged in parallel lines extending for substantially the length of the flat car 3. Thus, the appropriate set of slots 98 are chosen to properly position the trailers 2b on the flat cars 3.

The wheel support assemblies 73 are secured to the flat car platforms 20 by pivot pins 101 each comprising a shaft 102 with a handle 103 mounted on its upper end. With a wheel support assembly 73 properly positioned on a flat car platform 20, pivot pin apertures 106 in the wheel support assembly 74 and the platform 20 are aligned. Each pivot pin 101 has a helical retaining spring 111 positioned over its shaft 102 and exerting a force between a washer 112 and the upper pivot pin receiver 81.

Upper and lower pivot pin retainers 115 and 116 extend transversely through a lower portion of the pivot pin 101 at approximately 90° orientations with respect to each other. The retainers 115 and 116 provide a double safety-lock mechanism to prevent the pivot pin 101 from accidentally becoming dislodged in transit. When the pivot pin 101 is inserted, the lower retainer 116 is aligned to pass through the aperture 106 in the upper pivot pin receiver 81. The pivot pin 101 is then turned approximately 90° with the handle 103 to align the pivot pin retainers 115 and 116 for passing through the apertures 106 in the platform 20 and the lower pivot pin receiver 82 respectively. The pivot pin 101 is then rotated 90° again to pass the upper pivot pin retainer 115 through the aperture 106 in the platform 20, after which the shaft 102 is rotated 90° to lock the pivot pin 101 in its final position as shown in FIG. 11. The handle 103 is folded down into the cradle pivot pin receiver 93 to a folded position at or below the level of the cradle bottom 90 (FIG. 11).

A pair of chocks 121, which also serve as loading ramps, are mounted on the ends 91 of each cradle 88. As shown in FIG. 8, each chock 121, when viewed from the side, has a configuration roughly corresponding to a 45° right triangle, with a base 122 thereof curved slightly into the chock 121. The chocks are each pivotally connected to respective cradle sides 92a and 92b in proximity to the cradle bottom 90 and ends 91. As shown in FIG. 8, the chocks 121 have lowered, loading positions whereat their hypotenuse sides 124 form ramps between the platform upper deck surface 21 and the cradle bottom 90 for driving a semi-trailer 2 onto a respective wheel support assembly 73.

Chock latches 127 are provided for securing the butt plate boxes 74 to respective chocks 121 whereby the cradle 88 is prevented from rotating on the box 74 during loading operations with the chocks 121 in their down, loading ramp positions. Each chock latch 127 includes a chock latch bolt 128 slidably received in three guides 129, two of which are located on the box side 78 and the third being located on the chock 121.

With the latch 127 released, the chock 121 is foldable to an upper, travel position as shown in phantom in FIG. 8 whereat it is secured by a locking assembly 54 as described hereinbefore on the cradle outer side 92b and having a handle 58 selectively receivable in a chock locking aperture 131.

In operation, entire trains can be made up of units comprising three semi-trailers 2 piggybacked on two flat cars 3 as shown in FIG. 1. The trailers 2 may be loaded with overhead crane devices which are commonly used by the railroad companies at hub centers for assembling piggyback trains. For crane loading, the trailers 2 are raised over the flat cars 3 and lowered into their positions for transportation with their bogies 12 positioned in respective cradles 88 and their king pins 11 received in respective fifth wheel stanchions 30.

Alternatively, the system 1 of the present invention is designed to allow the trailers 2 to be driven onto the flat cars 3 by extending the ramps 36 therebetween and folding the chocks 121 to their lowered, loading positions. The semi-trailers 2 may then be driven over as many flat cars 3 as necessary to reach their final, loaded positions by suitable tractor units (not shown). The stanchions 30 are folded down as necessary on the platform upper deck surface 21. When the trailers 2 reach their loaded positions, the chocks 121 are folded to their travel positions and locked with the locking assemblies 54. The stanchions 30 are raised and receive the trailer king pins 11.

In transit, the brakes of the trailers 2 are preferably released so that the wheels 13 and 14 are free to roll slightly between the chocks 121 on respective trailer wheel cradles 88. Thus, when the train negotiates a curve, the king pin 11 is fixed with respect to the flat car 3. The wheels 13 and 14 on the outside of the turn shift slightly forwardly on the wheel cradle 88 and the wheels 13 and 14 on the inside of the turn shift slightly rearwardly. The chocks 121 of each cradle 88 are positioned in tandem in their travel positions with sufficient spacing therebetween to accommodate such slight movements of the wheels 13 and 14.

The cradles 88 pivot with respect to the butt plate boxes 74 about a vertical pivot axis extending through the pivot pins 101 when the flat cars 3 are angled with respect to each other, as when the train negotiates a curve. The cradle support flanges support the cradle bottoms 90 when the cradles 88 pivot with respect to the boxes 74.

The couplers 23 connecting the flat cars 3a, 3b are preferably immobilized with coupler spacing blocks (not shown) so that most of the slack between the cars 2a and 2b is eliminated. Such coupler spacing blocks are well known in the industry. See, for example, *General Rules Governing the Loading of Commodities on Open Top Cars*, published by the Association of American Railroads, Section No. 1, page 79. Furthermore, the uncoupling mechanism is preferably rendered inoperative between the flat cars 3a and 3b by a procedure also described in the aforementioned publication on page 79. Thus, damage to the middle, straddling trailer 2b which might otherwise result from displacement between the flat cars 3a and 3b is prevented.

FIGS. 12-15 show a system for transporting semi-trailers on flat cars comprising a first modified embodiment of the present invention and generally designated by the reference numeral 201. The modified system 201 is substantially similar to the previously described system 1 except for a modified wheel support assembly 273 mounted on the upper deck surface 21 of the flat car platform 20 in approximately the same location as the wheel support assembly 73. Each modified wheel support assembly 273 includes a butt plate box or spacer 274 approximately four to six inches high with opposite ends 277 that slope downwardly to the platform upper deck surface 21 to provide fixed ramps. A retaining bolt recess 278 is formed in each end 277 and receives a respective retaining bolt 279. Each retaining bolt 279 is threaded into a respective mounting block 281 secured to and protruding upwardly from the platform upper deck surface 21. A trailer wheel cradle 288 is pivotally mounted on the butt plate box 274 by a pivot pin 301.

A system for transporting three semi-trailers on two railroad flat cars comprising a second alternative of the present invention is shown in FIGS. 16 and 17 and is generally designated by the reference numeral 401. The system 401 is similar to the previously described systems 1 and 201 in construction and operation except for having a modified wheel support assembly 473. The wheel support assembly 473 includes a butt plate box or spacer 474 similar to the previously described butt plate box 74. A trailer wheel cradle 488 is pivotally mounted on top of the butt plate box 474 and includes a plurality of rollers 494 substantially covering the bottom 490 of the cradle 488.

A pair of chocks 521 are pivotally mounted on each end of the cradle 488 and each includes proximate and distal sections 522 and 523 respectively joined at a chock pivotal connection 524 where a base 525 and side 526 of the chock 521 intersect. In its travel position, the chock 521 is folded at its pivotal connection 524 so that the folded sections 522 and 523 occupy relatively little space on the cradle 88.

In operation, the rollers 494 permit trailers to be transported with their wheels locked since the differential movements thereof with respect to the flat car 3 are accommodated by the rollers 494. Otherwise, operation is essentially the same as with the previously described systems 1 and 201.

It is to be understood that while certain forms of the present invention have been illustrated and described herein, it is not to be limited to the specific forms or arrangement of parts described and shown.

What is claimed and desired to be sucured by Letters Patent is as follows:

1. A system for transporting a semi-trailer on first and second drawn vehicles with platforms and upper surfaces said semi-trailer including a king pin and a wheel assembly, having left and right sets of wheels, which comprises:
   (a) a stanchion foldably mounted on said first vehicle platform, said stanchion being foldable between a lower position substantially against said platform upper surface and a raised position extending upwardly from said platform upper surface;
   (b) first and second ramp assmblies mounted on opposite sides of respective vehicles, each said ramp assembly including:
      (1) a ramp carrier mounted on said vehicle platform upper surface and having a pair of spaced sides;
      (2) a ramp with proximate and distal ends and movable between a travel position located substantially within said carrier between said sides thereof and an extended position extending between said first and second drawn vehicles; and
   (c) a pair of wheel support assmblies each mounted on a respective side of said second vehicle and including:
      (1) a butt plate box with a top, a bottom, ends and sides;
      (2) mounting means for adjustably mounting said butt plate box on said second vehicle platform;
      (3) a trailer wheel cradle including an open top, a bottom, open ends and opposite sides;
      (4) wheel cradle mounting means adapted for pivotally mounting said wheel cradle on said butt plate box whereby said wheel cradle is adapted to pivot with respect to said butt plate box about a vertical pivotal axis;

(5) a pair of combination chocks and ramps each pivotally mounted on a respective cradle and having a loading ramp position extending between said platform surface and said cradle bottom and a chock travel position folded in said cradle; and (6) each said trailer wheel cradle being adapted to receive a respective trailer wheel set and adapted to pivot independently.

2. The system according to claim 1 wherein each said wheel support assembly includes:

(a) a pivot pin extending through said cradle and said spacer means and connected to said second drawn vehicle, said cradle vertical pivotal axis extending through said pivot pin.

3. The system according to claim 2, which includes:

(a) first and second pivot pin retaining means adapted for independently securing said pivot pin to said second vehicle.

4. The system according to claim 3 wherein:

(a) said first pivot pin retaining means comprises a first retainer mounted on a lower end of said pivot pin and extending transversely with respect thereto; and (b) said second pivot pin retaining means comprises a second retainer mounted on said pivot pin lower end below said first pivot pin and extending transversely with respect thereto, said retainers being aligned at approximately 90° with respect to each other.

5. The system according to claim 1, which includes:

(a) a pair of cradle support flanges extending outwardly from each said box side and adapted for supporting a respective cradle; when pivoted to a position skewed; with respect to said box.

6. The system according to claim 1 which includes:

(a) a latch mounted on each said butt plate box and adapted for selectively engaging said combination chock and ramp in its loading position whereby relative rotation between said butt plate box and said cradle is prevented.

7. The system according to claim 1 wherein said butt plate box mounting means comprises:

(a) a plurality of slots in said second vehicle upper surface, said slots being longitudinally aligned in a pair of lines; and (b) each said butt plate box having a downwardly-depending tab receivable in said slots whereby each said wheel support assembly can be positioned at different locations longitudinally along said second vehicle corresponding to the spacing between said slot.

8. The system according to claim 1 wherein:

(a) each said combination chock and ramp comprises proximate and distal sections, said proximate section being pivotally connected to said cradle and said distal section being pivotally connected to said proximate section.

9. The system according to claim 1 wherein:

(a) each said cradle includes a plurality of rollers adapted to allow a respective set of trailer wheels to shift longitudinally with respect to a respective wheel support assembly.

10. The system according to claim 1, which includes:

(a) each said ramp carrier having a pair of sides each having a guide slot; and (b) a pair of guide pins extending from said ramp and each slidably received in a respective guide slot.

11. The system according to claim 10, which includes:

(a) each said ramp having a vertical storage position extending upwardly from a respective vehicle; and (b) a ramp lock adapted to secure said ramp in its vertical storage position, said ramp lock having a handle adapted to extend through said ramp carrier side wall and into said ramp.

12. The system according to claim 1, which includes:

(a) each said vehicle being adapted to carry another trailer whereby three trailers are carried on said first and second vehicles.

13. In combination with first and second railway flatcars each having a platform and an upper surface, a system for transporting three semi-trailers each having a king pin and a wheel assembly, which comprises:

(a) a stanchion foldably mounted on said first flatcar platform, said stanchion being foldable between a lower position substantially against said platform upper surface and a raised position extending upwardly from said platform upper surface;

(b) first and second ramp assemblies each mounted on a respective flatcar and including:

(1) a ramp carrier mounted on said flatcar platform upper surface and having a pair of spaced sides; and (2) a pair of guide slots each in a respective ramp carrier side;

(3) a ramp with proximate and distal ends and a pair of guide pins extending from said proximate end, each said guide pin being slidably received in a respective guide slot;

(4) said ramp being moveable between a travel position located substantially within said carrier, a vertical storage position extending unwardly from a respective flatcar and an extended position extending between said flatcars;

(c) a pair of wheel support assemblies mounted on said second flatcar and each including:

(1) a butt plate box with a top, a bottom, ends, sides and front and back cradle support extensions extending outwardly from each side;

(2) a plurality of tabs extending downwardly from said butt plate box bottom and releasably received in corresponding slots in said second flatcar platform;

(3) a trailer wheel cradle including an open top, a bottom with a plurality of rollers rotatably mounted thereon, open ends and opposite sides;

(4) a wheel support assembly pivot pin extending through said cradle, said butt plate box and into said platform, said cradle being pivotable with respect to said butt plate box about a vertical axis extending through said pivot pin;

(5) a pair of combination chocks and ramps each pivotally mounted on a respective cradle end and having a loading ramp position extending between said platform surface and said cradle bottom and a chock travel position folded in said cradle, each said combination chock and ramp comprising proximate and distal sections, said proximate section being pivotally connected to said cradle and said distal section being pivotally connected to said proximate section; and (6) a chock latch mounted on said butt plate box side and adapted to selectively engage said combination ramp and chock for preventing relative rotation between said cradle and said butt plate box with said chock in its loading ramp position.

* * * * *